United States Patent [19]

Prosser

[11] 4,105,837
[45] Aug. 8, 1978

[54] CONVERSION OF STEREOREGULAR POLYPROPYLENE TO ATACTIC POLYPROPYLENE

[75] Inventor: Thomas John Prosser, Newark, Del.

[73] Assignee: Hercules Incorporated, Wilmington, Del.

[21] Appl. No.: 730,094

[22] Filed: Oct. 6, 1976

[51] Int. Cl.$^2$ .............................................. C08F 8/04
[52] U.S. Cl. ...................................... 526/26; 526/21; 526/25; 528/481
[58] Field of Search ..................... 528/481; 526/26, 25

[56] References Cited

U.S. PATENT DOCUMENTS

| | | | |
|---|---|---|---|
| 3,100,808 | 8/1963 | Dyer | 526/26 |
| 3,150,206 | 9/1964 | Miller et al. | 260/683.75 |
| 4,049,893 | 9/1977 | Kidwell | 526/26 |

Primary Examiner—William F. Hamrock
Attorney, Agent, or Firm—Charles L. Board

[57] ABSTRACT

Disclosed is a process for the conversion of stereoregular or crystallizable forms of polypropylene to the amorphous atactic form.

27 Claims, No Drawings

CONVERSION OF STEREOREGULAR POLYPROPYLENE TO ATACTIC POLYPROPYLENE

This invention relates to a process for the conversion of stereoregular polypropylene or mixtures of stereoregular and atactic polypropylene to stereorandom or atactic forms of polypropylene.

The process of this invention is carried out by contacting the polypropylene in solution or in molten form with a catalyst at elevated temperature, preferably under hydrogen pressure.

The process is of significance for partial or complete conversion of plastic grade, essentially isotactic polypropylene, into a more soluble product; for increasing the solubility of mixtures containing such isotactic polypropylene; and for conversion of the portion of as-polymerized polypropylene which is soluble in hot aliphatic hydrocarbons and which contains various stereoregular or crystallizable species into an atactic or noncrystallizable, more soluble form of polypropylene.

Polypropylene has been treated with nickel catalysts and hydrogen in prior art processes, but under relatively mild temperature conditions, aimed at either removing polymerization catalysts from the product, or reducing its unsaturation.

U.S. Pat. No. 3,331,824 describes a process for removing polymerization catalyst from crystalline or amorphous polymers of olefins by treatment with hydrogen and a nickel hydrogenation catalyst under conditions such that the polymerization catalyst is converted to an insoluble form, but the polymer is unchanged. Temperatures between 150° C. and 200° C. were employed. Higher temperatures are required for effecting the reconfiguration involved in this invention.

U.S. Pat. Nos. 3,547,870 and 3,515,687 describe a quite different process for sterically rearranging polypropylene to increase its solubility by treating it with a free radical initiator and a bromine compound in the range of 165° to 315° C. Because of the degrading action of the free radical initiator employed, isomerization under conditions which substantially decrease the crystallinity of the product result in excessive molecular weight reduction of the polymer.

The isomerization of low molecular weight monomeric hydrocarbons in the presence of metallic catalysts and hydrogen has been studied, as reported by R. L. Burwell, Accounts Chem. Res. 2, 289 (1969). However, low temperatures have been employed, very low conversion levels demonstrated, and no indication given of applicability to polymeric materials.

In the process of this invention, treatment of partially crystallizable or stereoregular polypropylene is effected by contact with a catalyst, preferably in an atmosphere of hydrogen under pressure at a temperature above 200° C. Under these conditions the polymer containing stereoregular components is randomly reconfigured resulting in the conversion to atactic polypropylene, so that a more hydrocarbon soluble, more transparent, and more uniform product is obtained.

It has been determined that catalysts suitable for use in carrying out this invention are those heretofore used in hydrogenation reactions. Thus, in the specification and in the claims the catalysts will be referred to as hydrogenation catalysts.

Polypropylene is recognized to exist in a number of forms differing in steric arrangement. Isotactic polypropylene, which is the principal component of the commercial plastic product, is a crystalline form melting at about 165° C. It has been shown by X-ray examination to consist of polymer chains in which the methyl groups on the fully extended chain are arranged on the same side of the chain.

Syndiotactic polypropylene which is obtained in small amounts in commercial polymerization processes is crystalline or crystallizable, but is lower melting and more hydrocarbon soluble. It has been shown to have a structure in which alternate methyl groups are present on the same side of the extended polymer chain.

Atactic or amorphous polypropylene is not crystalline or crystallizable and is soluble in aliphatic hydrocarbons, such as heptane, at room temperature. It is considered to have a steric form in which the methyl groups of the fully extended chain are randomly oriented on both sides of the chain, this random arrangement causing the inability to crystallize.

Polypropylene can also exist in block form, referred to as a stereoblock arrangement, in which crystallizable lengths of isotactic structure are combined in the same polymer chains with lengths of the syndiotactic form or atactic form or both. This form is also somewhat aliphatic hydrocarbon soluble at room or elevated temperature, the extent of solubility being determined by the relative amount and type of crystalline form present.

This invention provides a means for reconfiguring the stereoregular or crystallizable portions or sections of polypropylene into the atactic or amorphous form without excessive decrease in the molecular weight of the material. This process is particularly useful for increasing the utility of isotactic polypropylene or mixtures of atactic and stereoregular polypropylenes by converting them into the atactic or amorphous form, thus improving the solubility and compatibility characteristics, lowering the softening point, lowering the modulus, lowering the density, and increasing the elasticity of the product. Such reconfigured products have utility in applications such as solvent based, aqueous, and hot melt adhesives and as a chewing gum base resin.

In the commercial production of polypropylene, typically by polymerization of propylene with titanium chloride and aluminum alkyl catalysts, the major part of the product is isotactic and aliphatic hydrocarbon insoluble. However, in isolating the plastic grade polypropylene, there also is obtained a small amount of partially amorphous material which has much less value because it is a mixture of crystalline and noncrystalline products with partial solubility in hydrocarbon solvents. This by-product can be increased in utility by the process of this invention. If the crystalline portions of this material are reconfigured to a stereorandom form, the product has increased utility in hot melt, aqueous and solvent based adhesives, electronic cable filler fluids and other known applications for atactic polypropylene.

The process involves conversion of stereoregular or crystallizable forms of polypropylene into the amorphous, atactic form by treatment with a hydrogenation catalyst, preferably under hydrogen gas pressure at a temperature between about 200° C. and about 350° C. The process can be carried out batchwise or continuously (1) using a hydrocarbon solvent or (2) under molten conditions.

The process of this invention is applicable to any crystalline form of polypropylene, whether isotactic, syndiotactic or stereoblock or mixtures containing these crystalline forms. It is also applicable to random copolymers or block copolymers of propylene with other olefins containing crystalline polypropylene components. Examples of the latter type are random copolymers of propylene and ethylene or butene-1 containing sufficient propylene so there is a crystalline polypropylene component, and block copolymers of propylene with ethylene, butene-1, or other terminally unsaturated olefins.

Also applicable are mixtures of atactic polypropylene or ethylene-propylene random copolymers with crystalline polypropylene components. Some examples of the latter products are of relatively low utility since they are too low melting to be of value for plastic applications, and the crystalline components interfere with their use as elastomers or in adhesives in hot melt or solution form. This process makes possible reconfiguration of crystalline, hydrocarbon insoluble forms of polypropylene into an amorphous form which is lower melting, more transparent, more elastic and hydrocarbon soluble, and so of increased utility.

While normally essentially complete conversion of the stereoregular components to the atactic polypropylene form is preferred, in some case only partial conversion to a mixture containing a higher proportion of the atactic component may be advantageous.

Catalysts which are applicable for use in this process are any of the heterogeneous or solid catalysts useful for the hydrogenation of unsaturated organic compounds. These include metallic catalysts in solid form, such as Raney nickel, Raney cobalt, powdered platinum and palladium, metallic catalysts in supported form, such as palladium, platinum, other noble metals, nickel, cobalt, iron and chromium metals deposited on carbon, kieselguhr, alumina, silica, and other high surface area supports, and other catalysts useful for hydrogenation such as copper chromite, cobalt molybdate, iron oxide, and molybdenum oxide.

Contact with the catalyst may be effected in a stirred reactor or in a fixed bed continuous flow reactor.

Temperatures above 200° C. are normally required to effect a practical rate of conversion, with temperatures between about 250° and about 350° C. being recommended so that contact time can be kept below about 24 hours.

While temperatures above 350° C. can be employed, such temperatures are not recommended because of molecular weight decrease which becomes excessive above about 350° C. even though the reaction time required may be as low as 15 minutes at this temperature. Thus, recommended reaction temperatures are above 200° C. up to about 350° C.; preferably from about 250° to about 350° C.

While the process of this invention can be carried out in the absence of hydrogen, a positive hydrogen pressure is desirable to decrease the amount of molecular weight loss. A hydrogen pressure of 500 psi or above is preferred to prevent excessive molecular weight reduction. A suitable pressure range is from about 500 psi to about 10,000 psi.

The following examples are illustrative of this invention. In the examples, the softening temperatures of the polymers were determined according to the ring and ball method of ASTM E28. The intrinsic viscosities were determined in decalin at 135° C. The isotactic and atactic content of the various samples were determined by the infrared method as reported by J. P. Luongo, J. Appl. Poly. Sci. 3 (9) 302–309 (1960). Temperatures given in the examples are degrees centigrade; and parts and percentages are by weight unless otherwise indicated.

EXAMPLE 1

The material treated was a by-product mixture obtained in the commercial production of plastic grade polypropylene, consisting of the hydrocarbon soluble or dispersible portion of the polymerization product separated by filtration of the predominantly isotactic portion of the polypropylene from the hydrocarbon slurry formed in the polymerization. The material was an opaque, waxy solid with softening point of 148°, an intrinsic viscosity of 0.32 dl/g, and a melt viscosity of 740 centipoise at 177°. Total crystallinity, as determined by differential scanning calorimetry, was about 25%, which included about 2% isotactic crystallinity. Infrared analysis showed 78% atactic polypropylene content. To a mixture of 500 parts of this material in 575 parts of methylcyclohexane was added 50 parts of nickel on kiesulguhr hydrogenation catalyst (55% nickel, 2% zirconium), sold under the name Girdler G69 and available from the Catalyst Division, Chemetron Corp. This mixture was heated to 300° in an agitated vessel under a hydrogen atmosphere of 3500 psi and maintained at this temperature with agitation for 24 hours. After cooling, the mixture was diluted with about 100 parts hot xylene and was filtered to remove the catalyst. A clear colorless filtrate was obtained which was stripped in a rotary evaporator at 200° using a nitrogen carried stream to remove the xylene and the methylcyclohexane. The product recovered, in 97% yield, was a clear, colorless, soft, rubbery, tacky resin. It had a softening point of 34°, an intrinsic viscosity of 0.25 dl/g, and a melt viscosity of 440 centipoise at 177°. It showed no crystallinity by differential scanning calorimetry and by x-ray analysis. The $C^{13}$ nuclear magnetic resonance pattern was essentially identical to that calculated for 100% atactic polypropylene. Infrared analysis showed over 99% atactic polypropylene content. A 25% solids solution of this product in toluene was clear, colorless, and mobile. An equivalent attempted solution of the original untreated material of this concentration in toluene gave a cloudy semi-solid gel.

EXAMPLE 2

To 100 parts of the material used in Example 1 was added 115 parts of methylcyclohexane, and 10 parts of the nickel on kieselguhr catalyst used in Example 1. The mixture was heated to 325° for 12 hours with agitation under 5000 psi hydrogen pressure. The product was isolated in 93% yield by the method of Example 1. It was similar in appearance to the product of Example 1, showed no detectable crystallinity, over 99% atactic polypropylene content, and had an intrinsic viscosity of 0.21 dl/g and a melt viscosity of 300 centipoise at 177°.

EXAMPLE 3

The reaction as described in Example 2 was repeated except that a reaction temperature of 350° was employed. The product, obtained in 87% yield, was a clear, colorless syrup with an intrinsic viscosity of 0.11 dl/g and a melt viscosity at 117° of 40 centipoise, showed no crystallinity, and showed a 100% atactic polypropylene content.

EXAMPLE 4

The materials and reaction conditions employed in Example 2 were used except that the vessel was pressured with 5000 psi nitrogen and the reaction temperature was 300°. The product, obtained in 91% yield, was clear, light yellow in color, soft, rubbery, and tacky. It had an intrinsic viscosity of 0.17 dl/g, no detectable isotactic crystalline content by differential scanning calorimetry, and a melt viscosity of 120 centipoise at 117°. Infrared analysis showed over 99% atactic polyproylene content. A 25% solution of the product in toluene was clear, smooth, and slightly yellow.

EXAMPLE 5

The materials and conditions employed in Example 1 were repeated except that the temperature was 250°. The product recovered in 93% yield had a softening point of 94%, an intrinsic viscosity of 0.24 dl/g, a melt viscosity of 430 centipoise at 117°, and showed over 99% atactic polypropylene content. A 25% solution in toluene was mobile and smooth, but hazy.

EXAMPLE 6

The material used in this example was a by-prouct mixture obtained in the commercial production of plastic grade polypropylene. It had a softening point of 158°, an intrinsic viscosity of 0.52 dl/g, and a melt viscosity at 177° of 12,640 centipoise. It showed an isotactic crystallinity of about 3%, a total crystallinity of about 12%, and an atactic polypropylene content of 90%. To a mixture of 100 parts of this material and 115 parts of methylcylcohexane was added 10 parts of the nickel catalyst used in Example 1. The mixture was heated, with agitation, at 300° for 12 hours under 5000 psi hydrogen pressure. The product was recovered, as in Example 1, in 96% yield. It was a clear, colorless, rubbery, firm, tacky resin. The softening point of the recovered product was 135°, the intrinsic viscosity was 0.39 dl/g, the melt viscosity at 177° was 3660 centipoise, the isotactic crystallinity level was about 1%, and the atactic polypropylene content was 99%. A 25% solution of the product in toluene was hazy and slightly grainy. An equivalent attempted solution of the precursor resin was a cloudy, immobile gel.

EXAMPLE 7

The material treated in this example was plastic grade polypropylene, having an intrinsic viscosity of 2.69 dl/g and an isotactic crystallinity content of about 95%. To a mixture of 100 parts of the material and 310 parts of methylcyclohexane was added 10 parts of the nickel catalyst of Example 1 and the mixture was heated with agitation at 325° for 16 hours under 5000 psi hydrogen pressure. The product was recovered from the catalyst by repeated washing with o-dichlorobenzene and subsequent evaporation of the o-dichlorobenzene and methylcyclohexane. The product was a light amber, clear, rubbery, tacky resin with an intrinsic viscosity of 0.61 dl/g. The product showed no isotactic crystallinity. A 25% solution of the product in toluene was light tan, hazy, somewhat grainy mobile oil. The atactic polypropylene content was over 99%.

EXAMPLE 8

The procedure described in Example 7 was repeated using polypropylene having an intrinsic viscosity of 3.71 dl/g. The product was recovered by dilution with about 500 parts of xylene, filtration, and evaporation of the xylene and methylcyclohexane. The product, recovered in 97% yield, was a clear, slightly yellow, rubbery, tacky resin with an intrinsic viscosity of 0.61 dl/g, showed no isotactic crystallinity and had over 99% atactic polypropylene content. A 25% solution of the product in toluene was viscous, semi-gelatinous and essentially clear. The starting material was completely insoluble in toluene at ambient temperature.

EXAMPLE 9

A crystalline random copolymer of propylene and ethylene containing 7% ethylene and having an intrinsic viscosity of 2.84 dl/g was treated in the same manner as described in Example 8. The product, recovered in 100% yield, was a cloudy, tacky, soft resin with an intrinsic viscosity of 0.93 dl/g and showed no isotactic crystallinity and showed an atactic polypropylene content of 97%. A 25% solution in toluene was cloudy, smooth, and mobile. The original plastic material was insoluble in toluene.

EXAMPLE 10

A by-product mixture of the type used in Example 1 containing about 75% atactic polypropylene was pumped molten through a 1 inch tube reactor filled with pelleted supported nickel hydrogenation catalyst (50% Ni) countercurrent to a stream of hydrogen maintained at 4000 p.s.i. pressure. When the pumping rate was such that the contact time in the heated reactor was 54 minutes, the product contained 96% atactic polypropylene and had a melt viscosity at 177° of 510 centipoise. With the contact time regulated at 2.3 hours, the product had an atactic polypropylene content of 98% and a melt viscosity at 177° of 450 centipoise.

EXAMPLES 11–14

These examples show the effect of hydrogen pressure on the properties of the product prepared in a batch process. Mixtures of 100 parts of the by-product polypropylene used in Example 1, 10 parts of the powdered catalyst used in Example 1, and 114 parts deodorized kerosene solvent were agitated in a reactor at 300° for 16 hours. The hydrogen pressure in the atmosphere above the mixture was maintained at different levels in the several examples as shown in Table I below. The properties of the products obtained after isolation by the method used in Example 1 are also shown. Results are shown in Table 1.

Table I

| Ex. | Hydrogen Pressure (psi) | Intrinsic Viscosity (dl/g) | Isotactic Crystallinity (%) | Melt Viscosity at 177° (Centipoise) |
|---|---|---|---|---|
| 11 | 100 | 0.16 | 0.3 | 60 |
| 12 | 750 | 0.28 | 0.3 | 340 |
| 13 | 1500 | 0.21 | nil | 360 |
| 14 | 3500 | 0.33 | nil | 540 |

EXAMPLES 15–27

These examples illustrate the use of other hydrogenation catalysts. All runs were made using the starting material and isolation procedure employed in Example 1, 100 parts being mixed with 116 parts methylcyclohexane and 10 parts of catalyst. The conditions of the reaction were 300° for 12 hours, using 3500 psi hydrogen pressure. The catalysts employed and test data obtained are given in Table II below.

Table II

| Ex. | Catalyst | Atactic Polypropylene (%) | Intrinsic Viscosity (%) | Melt Viscosity at 177° (Centipoise) |
|---|---|---|---|---|
| 15 | Nickel on kieselguhr (same as Example 1) | 99+ | 0.28 | 460 |
| 16 | 5% Rhenium on carbon | 90 | 0.18 | 190 |
| 17 | 5% Rhodium on carbon | 100 | 0.13 | 50 |
| 18 | 5% Palladium on carbon | 91 | 0.24 | 290 |
| 19 | 1% Palladium on alumina | 94 | 0.21 | 160 |
| 20 | 5% Ruthenium on carbon | 100 | 0.05 | oil (at room temperature) |
| 21 | 5% Platinum on alumina | 99+ | 0.19 | 250 |
| 22 | 5% Iridium on carbon | 99+ | 0.20 | 240 |
| 23 | Cobalt on kieselguhr | 96 | 0.20 | 450 |
| 24 | Nickel on silica | 90 | 0.17 | 140 |
| 25 | Copper chromite | 87 | 0.13 | 130 |
| 26 | Copper magnesia chrome | 86 | 0.28 | 400 |
| 27 | Nickel-tungsten | 86 | 0.22 | 190 |

The process of this invention is useful for converting polypropylene which is essentially completely stereoregular in form or mixtures of stereoregular and atactic polypropylene into the atactic or non-crystallizable form which is of greater utility for many applications because it is more soluble, compatible with other materials, more transparent and more tacky and elastic in properties. High molecular weight isotactic or plastic grade polypropylene can be converted to a rubber which is useful as a component of solvent, hot melt or pressure sensitive adhesives, or as a chewing gum base. By-product mixed atactic and partially crystalline polypropylene which has little utility because of its incomplete solubility in common solvents and broad softening point range can be converted to a more homogeneous, light colored, readily soluble lower melting resin useful, for example, as a component of solvent, aqueous or hot melt adhesives, and in paper coatings. Uses are illustrated in the following examples.

EXAMPLE 28

A 30% toluene solution of the product as prepared in Example 6 was blended with a 15% solution of butyl rubber in toluene in a proportion of 56:44. A film of this composition was drawn down on a 2 mil oriented polyester film and dried 1 hour at room temperature, 1 hour at 60°, then 24 hours at room temperature. The Polyken tack value (ASTM Special Technical Publication No. 360, 1963) was measured as 816 g/cm$^2$. The 180° peel (Pressure Sensitive Tape Council Method 1) was 58 oz./in. width. These values are within the range of acceptable pressure sensitive adhesives.

EXAMPLE 29

A 50% solution in toluene of the reconfigured polypropylene product used in Example 28 was blended with a 50% solution in toluene of a polydipentene resin with a drop softening point of 115° in a ratio of 42:18. A film of this solution was drawn down, dried and tested as in Example 28. The Polyken tack value was greater than 1000 g/cm$^2$, and the 180° peel value was 65 oz./in. width.

EXAMPLE 30

A hot melt adhesive was prepared by melting together 45 parts of the product of Example 7, 25 parts of the glycerol ester of completely hydrogenated rosin, 30 parts of microcrystalline wax melting at 90°, and 0.2 parts of di-t-butyl-p-cresol antioxidant. This composition was a clear melt at 180°, was an opaque solid at room temperature, had a softening point of 115°, a cloud point of 84°, a Brookfield viscosity at 177° of 10,250 centipoise, and a molten Gardner color of 9. After storage at 177° for 48 hours, the melt was dark amber in color, slightly hazy, but with no phase separation or gel formation. On application as a hot melt adhesive between two layers of kraft paper, average T-peel values of 622 g/in. width, were obtained with fiber failure. When used to glue two layers of oriented polyester film, gave average T-peel values of 1407 g/in. width. The shear adhesion failure temperature for this hot melt (Pressure Sensitive Tape Council Method No. 7, adapted for use with corrugated board) was 86°.

The products of this invention can be used as a plasticizer for polymers such as polyethylene, crystalline polypropylene, and poly(vinyl chloride); as an anchor coating for bonding polypropylene film to other plastic films; as a heat seal coating on polypropylene film and other plastic films; as sizing agents for paper, both internal and external; as a pigment dispersant for polymers used in the manufacture of shaped members such as fibers and the like; as a thermoplastic elastomer for manufacture of shaped articles; as an anchor coating for extrusion coating of polypropylene and polyethylene onto metal substrates; as a thickening agent for oil well fracture fluids; as a viscosity index improver for lubricants; as a textile sizing agent or as a component of textile sizing agents; as a food thickener; and as a carrier for flavors and fragrances.

As is apparent from the working examples, the process of this invention can be employed to increase the atactic content of propylene polymers containing stereoregular polypropylene components. The preferred process will produce randomly reconfigured polypropylene having an atactic polypropylene content of at least about 98%.

The above description and working examples are illustrative of this invention and not in limitation thereof.

What I claim and desire to protect by Letters Patent is:

1. A process for treating a polymer of propylene containing stereoregular polypropylene components whereby at least a portion of the stereoregular polypropylene components are converted to the atactic form, said process comprising contacting the polymer with a hydrogenation catalyst at an elevated temperature above 200° C.

2. The process of claim 1 wherein the contacting is carried out under hydrogen pressure of at least about 500 p.s.i.

3. The process of claim 1 wherein the contacting is carried out under hydrogen pressure of at least about 500 p.s.i. and at a temperature of from about 250° to about 350° C.

4. The process of claim 1 wherein the hydrogenation catalyst is nickel.

5. The process of claim 2 wherein the hydrogenation catalyst is nickel.

6. The process of claim 3 wherein the hydrogenation catalyst is nickel.

7. The process of claim 1 wherein the hydrogenation catalyst is rhenium.

8. The process of claim 2 wherein the hydrogenation catalyst is rhenium.

9. The process of claim 3 wherein the hydrogenation catalyst is rhenium.

10. The process of claim 1 wherein the hydrogenation catalyst is rhodium.

11. The process of claim 2 wherein the hydrogenation catalyst is rhodium.

12. The process of claim 3 wherein the hydrogenation catalyst is rhodium.

13. The process of claim 1 wherein the hydrogenation catalyst is palladium.

14. The process of claim 2 wherein the hydrogenation catalyst is palladium.

15. The process of claim 3 wherein the hydrogenation catalyst is palladium.

16. The process of claim 1 wherein the hydrogenation catalyst is ruthenium.

17. The process of claim 2 wherein the hydrogenation catalyst is ruthenium.

18. The process of claim 3 wherein the hydrogenation catalyst in ruthenium.

19. The process of claim 1 wherein the hydrogenation catalyst is platinum.

20. The process of claim 2 wherein the hydrogenation catalyst is platinum.

21. The process of claim 3 wherein the hydrogenation catalyst is platinum.

22. The process of claim 1 wherein the hydrogenation catalyst is iridium.

23. The process of claim 2 wherein the hydrogenation catalyst is iridium.

24. The process of claim 3 wherein the hydrogenation catalyst is iridium.

25. The process of claim 1 wherein the hydrogenation catalyst is cobalt.

26. The process of claim 2 wherein the hydrogenation catalyst is cobalt.

27. The process of claim 3 wherein the hydrogenation catalyst is cobalt.

* * * * *